(12) United States Patent
Yamamoto (10) Patent No.: US 7,306,067 B2
(45) Date of Patent: Dec. 11, 2007

(54) ENGINE COUPLING SYSTEM

(75) Inventor: Masanobu Yamamoto, Iwata (JP)

(73) Assignee: Yamaha Hatsudoki Kabushiki Kaisha, Shizuoka (JP)

( * ) Notice: Subject to any disclaimer, the term of this patent is extended or adjusted under 35 U.S.C. 154(b) by 0 days.

(21) Appl. No.: 10/647,369

(22) Filed: Aug. 25, 2003

(65) Prior Publication Data

US 2004/0040767 A1 Mar. 4, 2004

(30) Foreign Application Priority Data

Aug. 27, 2002 (JP) ............................ 2002-246407

(51) Int. Cl.
*B62M 29/00* (2006.01)
*F16H 55/14* (2006.01)
*F16D 3/00* (2006.01)

(52) U.S. Cl. ..................... 180/186; 474/94; 464/74; 464/76

(58) Field of Classification Search .............. 180/9.1, 180/182, 186, 190; 474/94, 901; 74/411, 74/574; 440/52; 464/73, 74, 76, 89, 182; 123/192.1, 197.4
See application file for complete search history.

(56) References Cited

U.S. PATENT DOCUMENTS

| 3,120,745 | A |   | 2/1964  | Saurer |
| 3,918,534 | A | * | 11/1975 | Fogelholm ............ 173/162.1 |
| 4,037,431 | A | * | 7/1977  | Sugimoto ............... 464/73 |
| 4,069,882 | A | * | 1/1978  | Leonard et al. ......... 180/190 |
| 4,229,989 | A |   | 10/1980 | Tamura |
| 4,328,879 | A |   | 5/1982  | Tone .................... 180/219 |
| 4,372,415 | A | * | 2/1983  | Watanabe et al. ........ 180/215 |
| 4,464,144 | A |   | 8/1984  | Kobayashi et al. |
| 4,483,686 | A |   | 11/1984 | Kobayashi et al. |
| 4,520,890 | A |   | 6/1985  | Marier |
| 4,585,429 | A |   | 4/1986  | Marier |
| 4,848,503 | A |   | 7/1989  | Yasui et al. |
| 4,974,693 | A |   | 12/1990 | Nakai |
| 5,127,279 | A | * | 7/1992  | Barthruff ................ 74/6 |

(Continued)

FOREIGN PATENT DOCUMENTS

| EP | 0 049 805 A1 | 4/1982 |
| EP | 0 960 808 A2 | 12/1999 |

OTHER PUBLICATIONS

European Search Report of European Patent Application EP 03 019298.3, Dec. 15, 2003.
Co-Pending U.S. Appl. No. 10/094,748, filed Mar. 8, 2002. Title: Snowmobile. Inventors: Takashi Ashida et al.

(Continued)

*Primary Examiner*—Lesley D. Morris
*Assistant Examiner*—Daniel Yeagley
(74) *Attorney, Agent, or Firm*—Knobbe, Martens, Olson & Bear, LLP (57) ABSTRACT

A vehicle comprises a vehicle body. An internal combustion engine is mounted to the vehicle body. The engine comprises a crankshaft mounted in a crankcase. A drive system is mounted to the vehicle body. A transmission is coupled with the drive system. A coupling system couples the engine with the transmission. The coupling system comprises a drive member and a driven member. The drive member is coupled with the crankshaft. The driven member is coupled with the transmission. The driven member is rotatably mounted in the crankcase. The drive member is coupled with the driven member.

22 Claims, 7 Drawing Sheets

U.S. PATENT DOCUMENTS

| | | |
|---|---|---|
| 5,172,786 A | 12/1992 | Ishibashi |
| 5,279,381 A | 1/1994 | Fukuda |
| 5,515,940 A * | 5/1996 | Shichinohe et al. ........ 180/376 |
| 5,558,549 A * | 9/1996 | Nakase et al. ............ 440/88 L |
| 5,660,245 A | 8/1997 | Marier et al. |
| 5,720,638 A * | 2/1998 | Hale ........................... 440/83 |
| 5,839,930 A * | 11/1998 | Nanami et al. ............ 440/88 L |
| 5,846,102 A * | 12/1998 | Nitta et al. ..................... 440/1 |
| 5,957,740 A * | 9/1999 | Matsuda et al. .............. 440/52 |
| 5,967,868 A * | 10/1999 | Ito et al. ..................... 440/111 |
| 6,086,492 A | 7/2000 | Nakano et al. |
| 6,095,275 A * | 8/2000 | Shaw ......................... 180/185 |
| 6,155,371 A | 12/2000 | Izumi |
| 6,170,597 B1 | 1/2001 | Fukuda |
| 6,250,276 B1 | 6/2001 | Boll ........................... 123/198 |
| 6,269,899 B1 | 8/2001 | Izumi |
| 6,344,008 B1 | 2/2002 | Nagano et al. ................. 475/1 |
| 6,357,545 B1 * | 3/2002 | Hori et al. ................... 180/219 |
| 6,491,556 B2 * | 12/2002 | Muramatsu et al. ...... 440/88 R |
| 6,533,624 B1 * | 3/2003 | Nanami et al. ........... 440/88 R |
| 6,659,819 B2 * | 12/2003 | Fuse ........................... 440/83 |
| 6,725,958 B2 * | 4/2004 | Ashida et al. .............. 180/186 |
| 7,007,655 B2 * | 3/2006 | Yamamoto .............. 123/196 R |
| 2002/0033063 A1 | 3/2002 | Hojyo et al. ................... 74/413 |
| 2002/0033162 A1 | 3/2002 | Tsutsumikoshi ............ 123/196 |
| 2003/0075089 A1 * | 4/2003 | Matsuda et al. ........... 114/55.5 |

OTHER PUBLICATIONS

Co-Pending U.S. Appl. No. 10/327,582, filed on Dec. 20, 2003. Title: Snowmobile Exhaust System. Inventors: Takuji Nakano et al.

\* cited by examiner

ENGINE COUPLING SYSTEM

RELATED APPLICATIONS

This application is based upon and claims the priority of Japanese Patent Application No. 2002-246407, filed on Aug. 27, 2002, which is hereby incorporated by reference in its entirety.

BACKGROUND OF THE INVENTION

1. Field of the Invention

The present application generally relates to propulsion systems. More specifically, the present application relates to a coupling system for vehicle engines.

2. Description of the Related Art

Snowmobiles, and other vehicles, generally include an internal combustion engine mounted to the vehicle body. Additionally, such vehicles typically include a drive system mounted to the vehicle body for contacting a travel surface. A transmission can be included for coupling the internal combustion engine with the drive system of the vehicle.

A transmission can include an input shaft and an output shaft. One end of the input shaft is often coupled with the crankshaft of the engine. The other end of the output shaft is usually coupled with the drive system to transmit power to the drive system. When the internal combustion engine is driven, power is transmitted through the transmission to the drive system to enable the vehicle to travel along a travel surface.

SUMMARY OF THE INVENTION

One aspect of at least one of the inventions disclosed herein includes the realization that the connection between a crankshaft of an engine and an input shaft of a transmission can be improved by supporting the input shaft with the body of the engine and connecting the input shaft to the crankshaft through a damper. As such, the loads on the crankshaft can be reduced while the durability of the connection between the crankshaft and the input shaft can be enhanced.

For example, known assemblies for coupling an input shaft of a transmission to a crankshaft of an engine of, for example, but without limitation, a snowmobile, rely on a direct, rigid connection between the input shaft and the crankshaft. As such, loads imparted to the input shaft are directly transferred to the crankshaft of the engine in the form of torsional and bending loads. Thus, in order to increase the strength of the connection between the input shaft and the crankshaft, the input shaft and/or the crankshaft must be made larger. Changing the shape of a crankshaft requires significant design considerations in light of, for example, the number of bearings typically used to support a crankshaft and balancing. Thus, by configuring the crankcase to support the input shaft, the crankcase can absorb some of the loads transmitted from the input shaft, thereby reducing the total load on the crankshaft and avoiding the need to redesign the crankshaft.

Thus, in accordance with another aspect of at least one of the inventions disclosed herein, a vehicle comprises a vehicle body and an internal combustion engine mounted to the vehicle body. The engine comprises a crankshaft mounted in a crankcase. The crankshaft extends along a first axis. A drive system is mounted to the vehicle body. The drive system is for contacting a travel surface. Rotation of at least a portion of the drive system enables movement of the vehicle body relative the travel surface. A transmission is coupled with the drive system. A coupling system couples the engine with the transmission. The coupling system comprises a drive member and a driven member. The drive member is located along the first axis and is coupled with the crankshaft. The driven member is located along the first axis and is coupled with the transmission. The driven member is rotatably mounted in the crankcase. The drive member is coupled with the driven member.

Another aspect of at least one of the inventions disclosed herein involves a vehicle that comprises a vehicle body. An internal combustion engine is mounted to the vehicle body. The engine comprises a crankshaft mounted in a crankcase. A drive system is mounted to the vehicle body. The drive system is for contacting a travel surface. A transmission is coupled with said drive system. A means for coupling the engine with the transmission within the crankcase is provided.

BRIEF DESCRIPTION OF THE DRAWINGS

These and other features, aspects and advantages of the present invention will be better understood with reference to a preferred embodiment, which is illustrated in the accompanying drawings. The illustrated embodiment is merely exemplary and is not intended to define the outer limits of the scope of the present invention. The drawings of the illustrated arrangement comprise seven figures.

DETAILED DESCRIPTION OF THE PREFERRED EMBODIMENT

Figure 1:
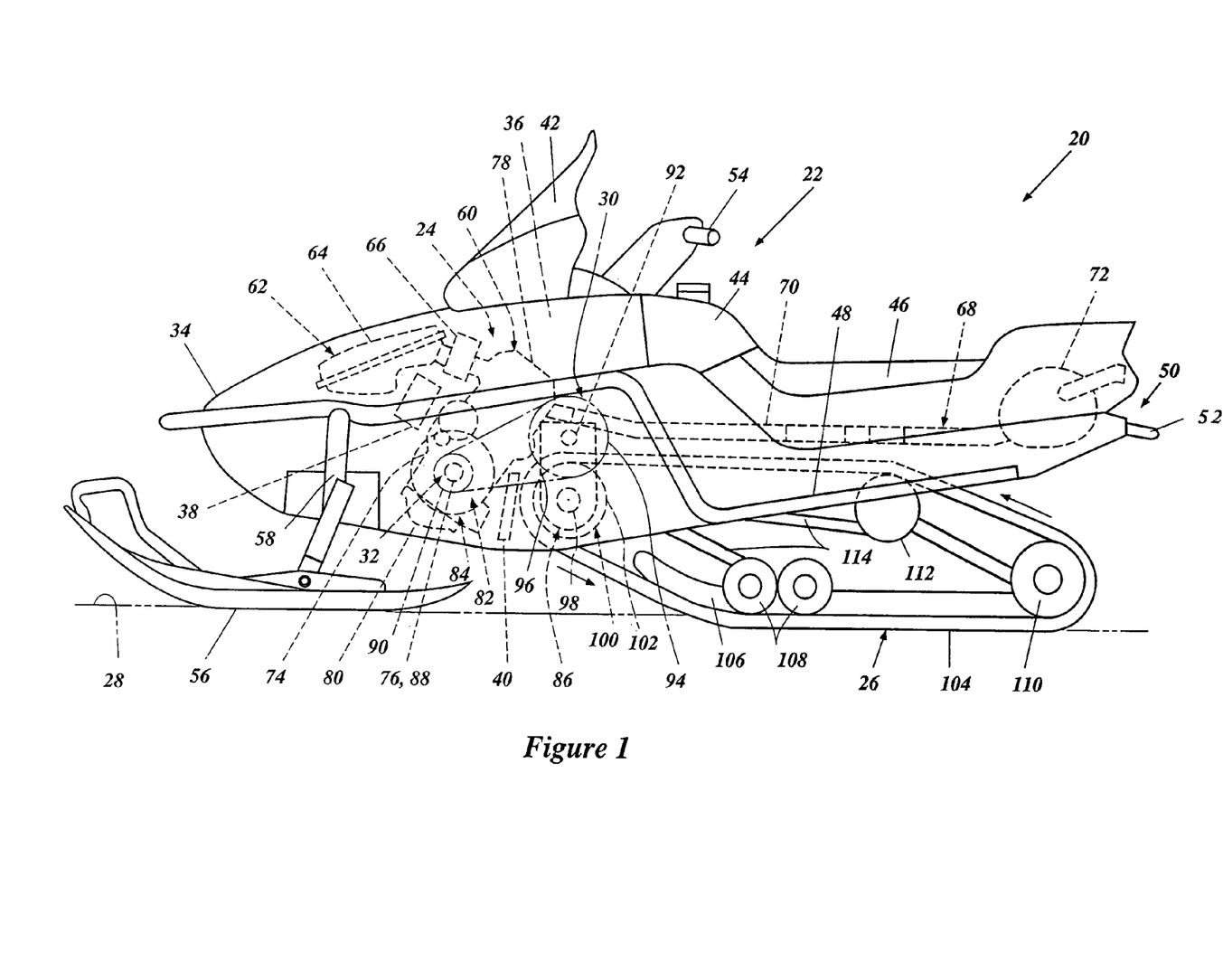
FIG. 1 is a side elevational view of a snowmobile with certain internal portions shown, including an engine, a transmission, and a coupling in hidden line.

With reference to FIG. 1, a vehicle 20 having certain features, aspects and advantages of the present inventions is described below. As shown in FIG. 1, the vehicle 20 is a snowmobile. A snowmobile is an environment for which many features, aspects and advantages of the present inventions provide particular advantages. Nevertheless, certain features, aspects and advantages of the present inventions can be used with other vehicles 20, such as all-terrain vehicles and watercraft.

As shown in FIG. 1, the vehicle 20 comprises a vehicle body 22, an internal combustion engine 24 mounted to the vehicle body 22, a drive system 26 mounted to the vehicle body 22 for contacting a travel surface 28 to enable movement of the vehicle 20 relative the travel surface 28, a transmission system 30 coupled with the drive system 26, and a coupling device 32 for coupling the engine 24 with the transmission 30.

The vehicle body 22 carries a number of other components of the vehicle 20. For example, a vehicle body cover 34 is disposed over the vehicle body 22. The vehicle body cover 34 defines, in part, an engine compartment 36 in which the engine 24 is mounted. The engine 24 is described in greater detail below. A battery 38 and a heat exchanger 40 are shown within the vehicle body 22 and are also described in further detail below.

A windshield 42 is disposed over a mid-portion of the vehicle body cover 34. The windshield 42 provides some degree of protection for the riders from wind and other elements during operation of the vehicle 20. Rearward of the windshield 42, a fuel tank 44 is mounted to the vehicle body 22 in a manner that allows the vehicle body cover 34 and the fuel tank 44 to appear to blend together.

A seat 46 is mounted to the vehicle body 22, rearward of the fuel tank 44. The seat 46 preferably is a saddle-type seat. Foot rests 48 project from the sides of the vehicle body 22, adjacent to the seat 46.

A grab bar 50 is disposed rearward from the seat 46, The grab bar 50 comprises a grabbing portion 52 that can be used to raise a rear portion of the vehicle 20 for turning and maneuvering when the vehicle 20 is not being ridden. The illustrated grab bar 50 is generally U-shaped and is mounted in a generally horizontal manner. However, other forms of grab bars can be used. For instance, the grab bar 50 can be define one or a plurality of loops, or it can be semicircular, in a vertical or an inclined in orientation. Thus, any suitable grab bar construction can be used.

Forward of the seat 46 and the fuel tank 44, a steering handle assembly 54 is disposed. The steering handle assembly 54 can carry appropriate controls and can be coupled to a pair of front skis 56. Manipulation of the steering handle assembly 54 causes the direction of the vehicle 20 to be altered. The skis 56 are mounted to the vehicle body 22 through a front suspension assembly 58. Any suitable front suspension assembly 58 can be used.

The engine 24 in the illustrated arrangement is a four-cycle, multi-cylinder engine mounted within the engine compartment 36. The engine 24 has an engine body 60 that is supported on the vehicle body 22.

An intake system 62 is configured to introduce air and fuel into the engine body 60. The intake system 62 comprises an air filter 64 and a carburetor 66.

An exhaust system 68 is configured to discharge exhaust gases to the atmosphere after combustion in the engine 24. The exhaust system 68 comprises exhaust pipes 70 and a muffler 72.

The engine body 60 comprises a crankcase 74 supported on the vehicle body 22. The crankcase 74 houses a crankshaft 76. The engine body 60 comprises a plurality of cylinders 78 projecting upward from the crankcase 74 toward the rear of the vehicle 20. The engine body 60 comprises an oil pan 80 covering a bottom portion of the crankcase 74. The engine 24 and engine body 60 are described in greater detail below.

Figure 2:
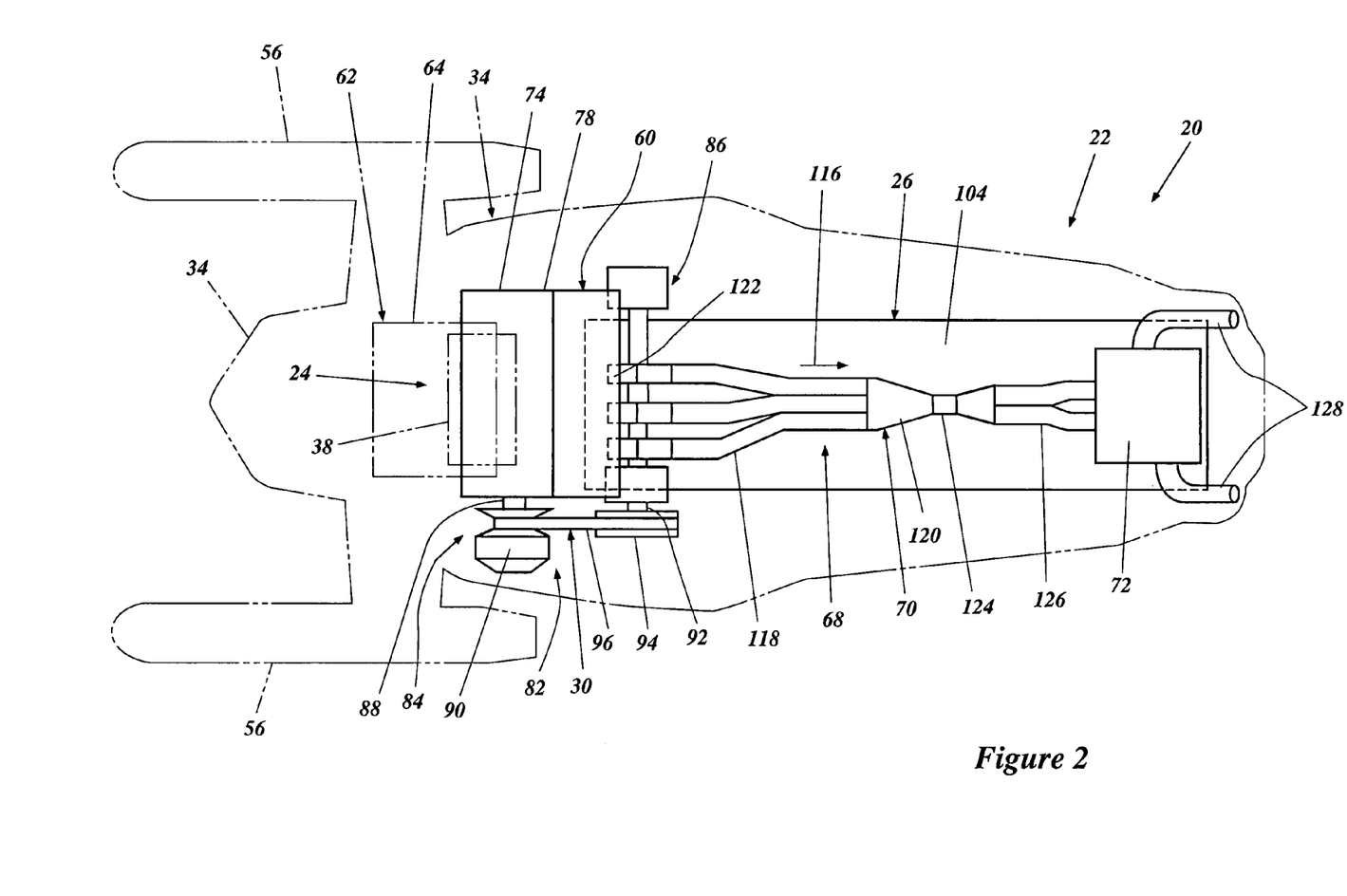
FIG. 2 is a schematic top plan view showing some of the internal components of the snowmobile of FIG. 1.

As shown in FIGS. 1 and 2, the engine 24 drives a transmission system 30, which is a continuously variable transmission. Other transmissions can also be used. The transmission system 30 preferably is coupled with the engine 24 through a coupling device 32, described in further detail below. In the illustrated arrangement, the transmission system 30 comprises a pulley system 82, a speed change gear system 84, and a power transmission gear system 86.

The pulley system 82 comprises an input shaft 88 coupled with a drive pulley 90 and an output shaft 92 coupled with a driven pulley 94. The input shaft 88 can be coupled with the drive pulley 90 through the speed change gear system 84.

The speed change gear system 84 can comprise a clutch, a centrifugal clutch, or a sprag clutch. In other embodiments, the input shaft 88 can be directly coupled with the drive pulley 90.

The drive pulley 90 powers a driven pulley 94 through a transmission belt 96. In the illustrated arrangement the transmission belt 96 is a v-belt 96. In some configurations, a drive chain can be used in place of the v-belt 96. Other arrangements also can be used.

The driven pulley 94 is connected to and rotates about an output shaft 92. The output shaft 92 is coupled with the power transmission gear system 86. The transmission system 30 and the drive system 26 are coupled through the power transmission gear system 86.

As shown in FIG. 1, the drive system 26 comprises a drive shaft 98 coupled with the transmission system 30 through the power transmission gear system 86. The drive shaft 98 powers a drive unit 100. The drive unit 100 generally comprises a plurality of drive wheels 102 and a drive track 104. The drive wheels 102 provide a motive force to the drive track 104, which is commonly used in the vehicle industry.

With continued reference to FIG. 1, the drive track 104 is guided around a preferred path on a pair of slide rails 106, a plurality of suspension wheels 108 and main rear suspension wheels 110. The slide rails 106 preferably support the suspension wheels 108 and the main rear suspension wheels 110.

An idler roller 112 preferably is mounted to the vehicle body 22 and is configured to help to define the preferred path for the drive track 104. As is known in the vehicle industry, these components can be mounted to the vehicle body 22 with a rear suspension system 114. Any suitable rear suspension system 114 can be used and certain portions of the rear suspension system 114 have been schematically illustrated in FIGS. 1 and 2.

Many of the above-described components are generally conventional and can be arranged and configured in any suitable manner. Additionally, the above-described components can be replaced by other suitable components where desired. Any details omitted to this point have been considered well within the design knowledge of those of ordinary skill in the art.

FIG. 2 further illustrates the exhaust system 68 of the vehicle 20. As noted above, combustion byproducts are exhausted through the exhaust system 68, along the direction identified generally by the reference numeral 116. In the illustrated arrangement, the exhaust system 68 comprises an exhaust pipe 70 that extends rearward from the engine 24.

The exhaust pipe 70 comprises exhaust runners 118 that extend rearward from the engine 24. The exhaust runners 118 can be tuned for improved engine performance. Additionally, the length of each runner 118 can be lengthened prior to merging together with any other runners 118 of the exhaust pipe 70 such that pulse effects between the exhaust runners can be reduced. Optionally, an attenuation chamber or passage 120 between two or more runners can be used to reduce the effect of reflected pressure pulses in the exhaust system 68.

With continued reference to FIG. 2, each exhaust runner 118 includes an upstream end communicating with a respective cylinder defined by the engine body 60. In the illustrated embodiment, each exhaust runner 118 is coupled to an exhaust discharge pipe 122 that is individually joined to the engine body 60, e.g., with a flange. At least two of the runners 118 join at a merge location 124 and the merged flow then divides into manifold pipes 126. In some arrangements, a single manifold pipe can be used.

The manifold pipes 126 extend rearward to a muffler 72. The muffler 72 provides an enlarged volume into which the exhaust can flow. Exhaust energy is dissipated within muffler 72 and the noise level of the exhaust can thus be decreased. In the illustrated arrangement, the muffler 72 is disposed below a portion of the seat 46 that is rearward of a rider section of the seat 46.

Two exhaust pipe ends 128 extend rearward from the muffler 72. In some arrangements, a single exhaust pipe end 128 can extend from the muffler 72. Other numbers of exhaust pipe ends 128 also can be used. The exhaust pipes 70 preferably discharge exhaust gases 116 into the atmosphere. As illustrated in FIG. 1, the exhaust pipe ends 128 can extend upwardly and rearwardly from the muffler 72. Preferably, the exhaust pipe ends 128 terminate at a location forward of the grab portion 52 of the grab bar 50.

Figure 3:
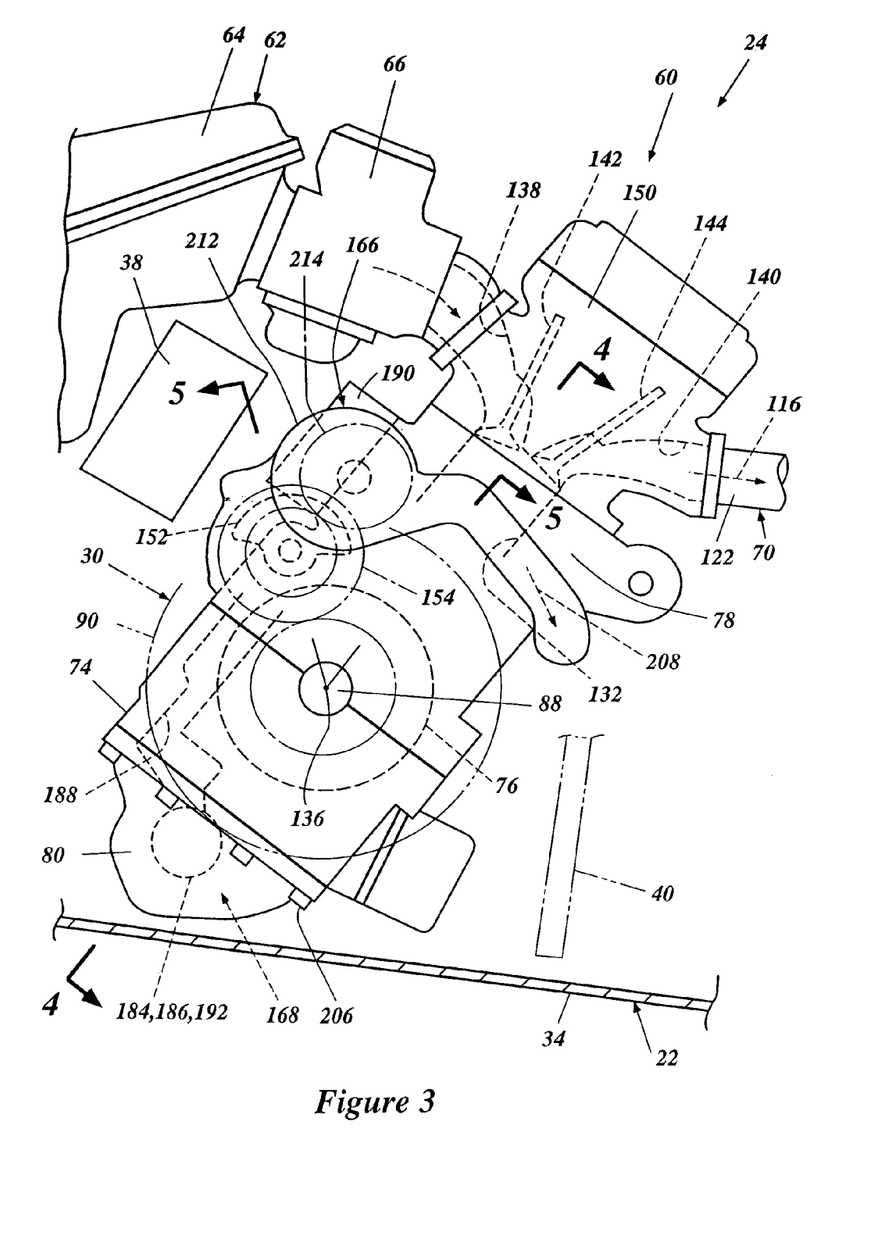
FIG. 3 is a side elevational view of the engine illustrated in FIG. 1 with certain internal components thereof shown in hidden line.
Figure 4:
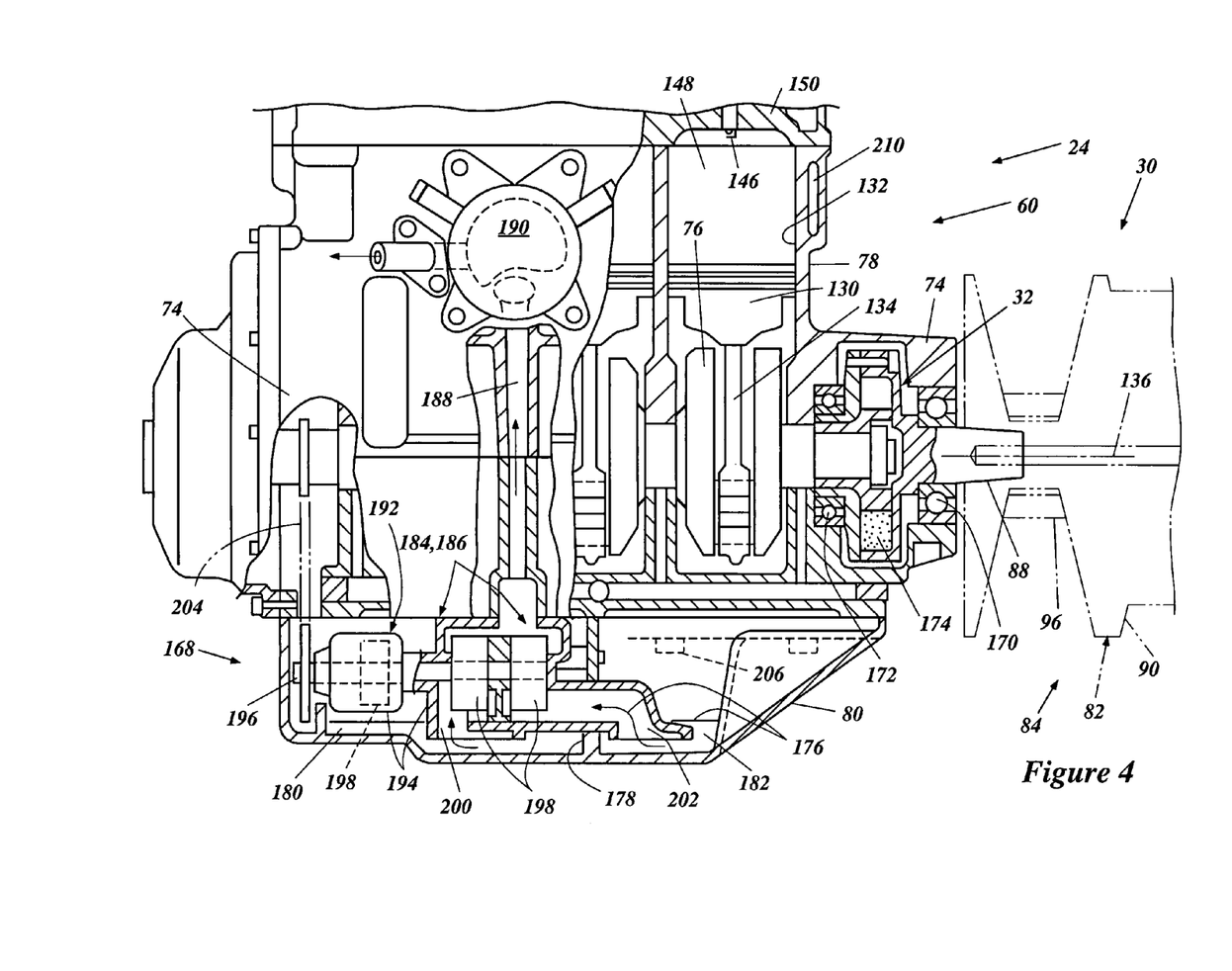
FIG. 4 is a partial section view of the engine of FIG. 3 taken along line 4-4 in FIG. 3.
Figure 5:
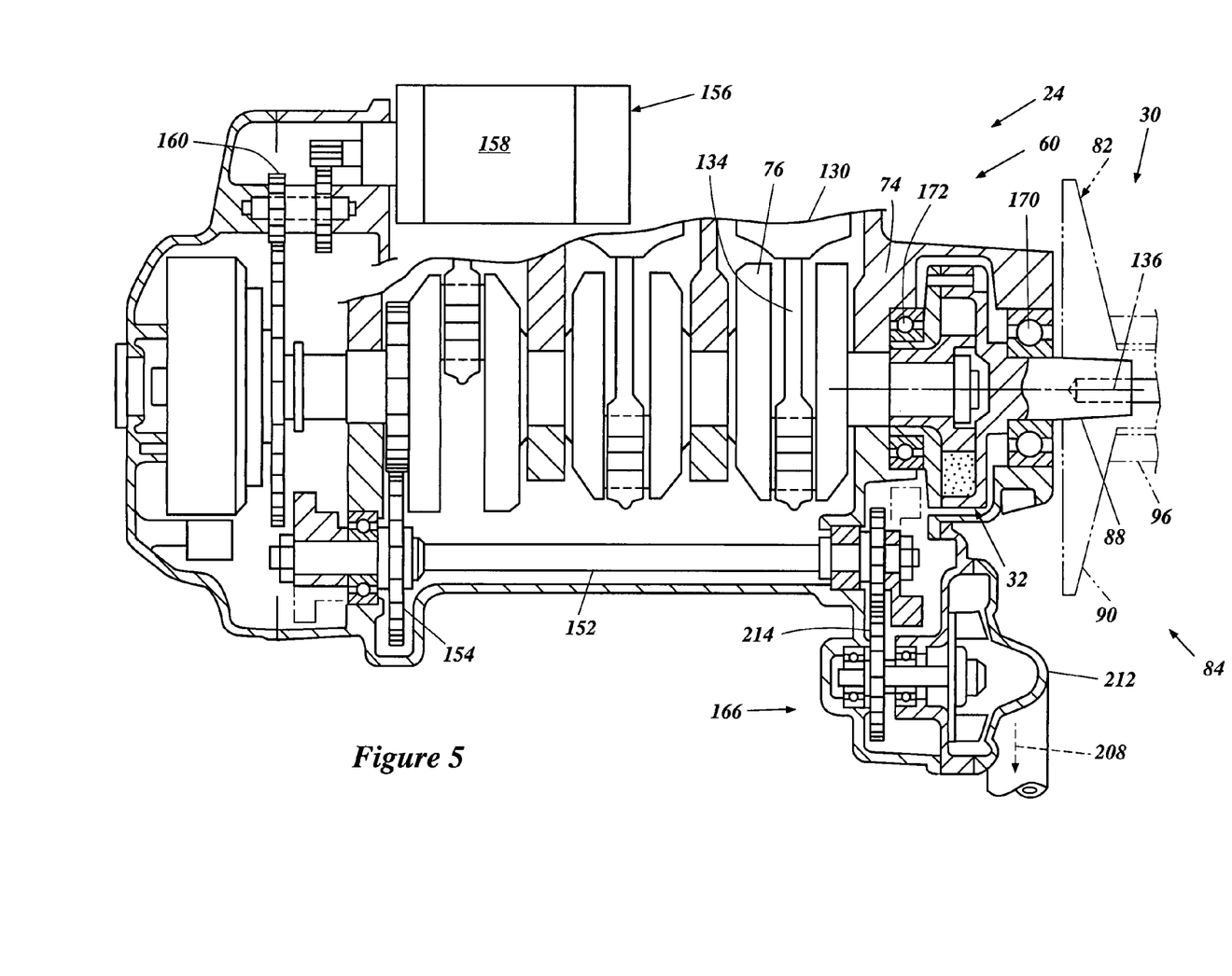
FIG. 5 is a partial section view of the engine of FIG. 3 taken along line 5-5 in FIG. 3.

As shown in FIGS. 3, 4, and 5, the engine body 60 comprises a crankcase 74 housing a crankshaft 76, a cylinder block 78 defining cylinder bores 132 projecting rearwardly and upwardly from the crankcase 74, an oil pan 80 provided to cover an underside of the crankcase 74, pistons 130 slidably fitted in the cylinder bores 132, and connecting rods 134 which couple the crankshaft 76 with the pistons 130. An axis 136 of the crankshaft 76 extends horizontally, from one side of the vehicle body 22 to the other. A cylinder head 150 closes the upper ends of the cylinder bores 132. The cylinder bores 132, the upper surfaces of the pistons 130, and a lower surface of the cylinder head 150 together define corresponding combustion chambers 148 (FIG. 4).

Intake and exhaust passages 138, 140 are defined in the cylinder head 150 to provide access to the combustion chambers 148. Intake and exhaust valves 142, 144 are movable to open and close the intake and exhaust passages 138, 140, respectively. A valve mechanism (not shown) operates the intake and exhaust valves 142, 144 to open and close appropriately in association with the crankshaft 76.

The engine 24 further includes an ignition system. With reference to FIG. 4, spark plugs 146, at least one for each of the combustion chambers 148, are affixed to the cylinder head 150 so that electrodes, which are defined at one end of the spark plugs 146, are exposed to the respective combustion chambers 148. Spark plugs 146 preferably are fired in a conventional manner so as to ignite an air/fuel charge during each combustion or "power" stroke.

As shown in FIGS. 3 and 5, the engine 24 can comprise a balancer shaft 152. The balancer shaft 152 is located above the crankshaft 76 and extends generally parallel to the crankshaft 76. The engine 24 can also comprise a balancer shaft gear system 154 configured to drive the balancer shaft 152. For example, the balancer shaft gear system 154 can couple the balancer shaft 152 to the crankshaft 76.

The engine 24 can also comprise a starter 156 for starting the engine 24. The starter 156 can include a starter motor 158 coupled with the crankshaft 76 through a starter gear system 160.

As shown in FIG. 3, the intake system 62 includes a carburetor 66. The carburetor 66 is located adjacent a forward-facing surface of the engine body 60. The carburetor 66 can be configured to mix air 62 and fuel 64 for combustion in the combustion chambers 148. An air filter 64 supplies air to the carburetor 66. The air filter 64 is located above the front surface of the cylinder 78 and in front of, and above, the balancer shaft 152.

A cooling system 166 is provided for cooling the internal combustion engine 24. The cooling system 166 is described further below with reference to FIG. 5. A lubrication system 168 is described further below with reference to FIG. 4.

As shown in FIG. 4, the transmission 30 includes an input shaft 88 located generally along the same axis 136 as the crankshaft 76. The input shaft 88 is coupled with the crankshaft 76 through the coupling device 32. The input shaft 88 is coupled with the drive pulley 90 such that the drive pulley 90 is supported on the input shaft 88 and rotates with the input shaft 88.

The coupling device 32 is supported within the crankcase 74 by at least one bearing. Preferably, two set of bearings support the coupling device 32. In the illustrated embodiment, the coupling device 32 is supported by inner and outer bearings 170, 172. As used herein, the terms "outer" and "inner" refer to the positions of the bearings 170, 172 relative to each other and the engine body 60, i.e., the bearing 172 is disposed closer to the center of the engine body 60 relative to the position of the bearing 170. However, other orientations are possible.

The coupling device 32 is rotatable about the axis 136 of the crankshaft 76. The coupling device 32 is coupled to the crankshaft 76 and the input shaft 88. The input shaft 88 is supported by the coupling device 32. The drive pulley 90 is supported on the input shaft 88. A further advantage is provided where the coupling device 32 comprises a damper 174. The coupling device 32 is described further below with reference to FIGS. 6 and 7.

As shown in FIG. 4, a lubrication system 168 is provided to lubricate the engine 24. Portions of the lubrication system 168 are also shown in FIG. 3. The lubrication system 168 comprises an oil pan 80 capable of storing oil 176. The illustrated lubrication system 168 is known as a dry-sump lubrication system. Thus, the oil pan 80 is usually referred to as an "oil cap". However, one of ordinary skill in the art recognizes that the present lubrication system features can be incorporated into any type of lubrication system, including dry-sump and wet-sump recirculating-lubricant systems, as well as other types of lubrication systems.

A regulating wall 178 separates a first chamber 180 from a second chamber 182 inside the oil pan 80. In the illustrated embodiment, the wall 178 is formed on the oil pan 80. However, in other embodiments, the wall 178 can be part of the crankcase.

The regulating wall 170 is approximately centered with respect to side portions of the vehicle body 22. Thus, the first and second chambers 180,182 are referred to hereinafter as side chambers 180,182.

However, one of ordinary skill in the art recognizes that if the engine 24 were mounted in a vehicle such that the crankshaft 88 extends parallel to a longitudinal axis of the vehicle, the chambers 180, 182 would be arranged one in front of the other. In other words, the chambers 180,182 could be referred to as forward and rearward chambers. Additionally, it is to be noted that in such a vehicle, the regulating wall 178 can be arranged so as to extend generally parallel to a longitudinal axis of the vehicle. As such, the wall 178 would define side chambers, similar to the illustrated embodiment.

Preferably, the wall 178 is configured to restrict the flow of oil 176 within the oil pan 80. Additionally, the wall 178 preferably is configured to distribute oil 176 generally evenly between the first and second side chambers 180, 182.

The lubrication system 168 also comprises first and second oil pumps 184, 186. The first and second oil pumps 184, 186 can both be scavenging pumps that draw the oil 176 from the oil pan 80. The first and second oil pumps 184, 186 pump the oil 176 into a common oil passage 188 formed in the cylinder block 78 and then into an oil tank (not shown) to store the oil 176 therein.

Optionally, the engine 24 can also include an oil cooler 190 configured to extract heat from the oil 176. In the illustrated embodiment, the oil cooler 190 is mounted on the front surfaces of the cylinder block 78. The first and second oil pumps 184, 186 pump oil 176 through the oil passage 188 into the oil cooler 190 to cool the oil 176.

The lubrication system 168 also comprises an oil feed pump 192 for supplying the oil 176 stored in the oil tank to portions of the engine 24 which benefit from lubrication. The first and second oil pumps 184, 186 and the oil feed pump 192 comprise pump casings 194.

A pump shaft 196 passes through the respective pump casings 194 and is rotatable about an axis extending generally parallel to the crankshaft 80. In the illustrated embodiment, the crankshaft 80 and the oil pump shaft 196 extend in a lateral direction relative the vehicle body 22.

The first and second oil pumps 184, 186, and the oil feed pump 192, comprise rotors 198 housed within the respective pump casings 194 coupled with the pump shaft 196 to rotate with the pump shaft 196. It is to be noted that the shaft 196 can be formed from a single member, or a plurality of shaft members connected to each other in an end-to-end fashion. As such, each rotor (or impeller) 198 can be mounted on a separate shaft member. In the illustrated embodiment, the shaft 196 is formed from a single member.

First and second oil inlet ports 200, 202 are formed in the pump casings 194 of the respective oil pumps 184, 186. The first oil inlet port 200 extends between the first side chamber 180 and the first oil pump 184. The second oil inlet port 202 extends between the second side chamber 182 and the second oil pump 186. Thus, during operation, the first and second oil inlet ports 200, 202 draw oil 176 from the first and second side chambers 180, 182 respectively.

The pump shaft 196 supports the rotors 198 of the first oil pump 184, the second oil pump 186, and the oil feed pump 192, and thus defines a single axis. The pump shaft 196 is coupled with the crankshaft 76 by a chain coupler 204. Thus, respective oil pumps 184, 186, 192 can be driven together with the engine 24 through a single drive device, thereby simplifying the construction of the lubrication system and lowering the weight of the engine 24.

A further advantage is provided where the pump casings 194 of the first and second oil pumps 184, 186 are both located within one of the first and second chambers 180, 182. As such, the pumps 184, 186 form a compact unit and are more easily accessible. Further, the pump casings 194 of the first and second oil pumps 184, 186 can be molded together. Additionally, the casings of all three pumps 184, 186, 192 can be formed in one piece, thereby forming a single compact unit that can be more easily removed and re-installed.

Another advantage is provided where the pumps 184, 186 are disposed so as to extend downwardly from the crankcase 74. For example, as shown in FIG. 4, the pumps 184, 186 are disposed generally below the crankshaft 88. As such, when the oil pan 80 is removed from the crankcase 74, the pumps 184, 186 are more exposed, thereby providing easier access to the pumps 184, 186. The pump casings 194 can be detachably clamped to the underside of the crankcase 74 by fasteners. As such, the pump casings 194 can be more easily removed from below the engine 24 when the oil pan 80 is removed.

As the engine 24 is driven, the respective oil pumps 184, 186 draw oil 176 from the oil pan 80 and deliver it into the oil tank. As the oil feed pump 192 is driven, the oil 176 stored in the oil tank is delivered to the various portions of the engine 24 to lubricate the engine 24. After lubrication, the oil 176 naturally flows down into the first and second side chambers 180, 182 of the oil pan 80.

The oil pan 80 is detachably clamped to the underside of the crankcase 74 by fasteners 206. In the illustrated embodiment, when the oil pan 80 is detached from the underside of the crankcase 74, the respective oil pumps 184, 186, 192 and a lower portion of the chain coupler 204 protrude downwardly from the underside of the crankcase 74. As such, the illustrated embodiment provides a further advantage in providing easier access to the respective oil pumps 184, 186, 192 and the chain coupler 204 for the maintenance and inspection thereof.

FIG. 5 shows the engine 24, a cooling system 166, a balancer shaft 152, and a starter 156. Portions of the cooling system 166 are also shown in FIGS. 3 and 4.

In the illustrated embodiment, the cooling system 166 is configured to cool the engine 24 with coolant 208. The cooling system 166 comprises coolant jackets 210 formed in the cylinder block 78 and the oil cooler 190. A coolant pump 212 is located above the crankshaft 76 and is supported on the cylinders 78. The coolant pump 212 is configured to deliver coolant 208 to the coolant jackets 210 (shown in FIG. 4).

The cooling system 166 also comprises a coolant pump gear system 214 to couple the coolant pump 212 to the balancer shaft 152. The cooling system 166 further comprises a heat exchanger 40 (shown in FIGS. 1 and 3) located behind the crankcase 74 for air cooling the coolant 208 after it circulates through the coolant jackets 210. As the engine 24 is driven, the coolant pump 212 circulates coolant 208 to cool the engine 24.

A battery 38, as shown in FIGS. 1, 2 and 3, is provided for supplying electric power to the spark plugs 146 of the engine 24, the starter motor 158 of the starter device 156, an engine control device (not shown), as well as other components. The battery 38 is located above and in front of the engine body 60, in front of the balancer shaft 152, and below the air filter 64, substantially in the center of the vehicle body 22 relative side portions of the vehicle body 22. The battery 38 is supported by the vehicle body 22.

When the starter motor 158 cranks the crankshaft 76 to start up the engine 24, air 62 and fuel 64 are drawn into the cylinders 78 from the intake device 62. A mixture of air 62 and fuel 64 is ignited inside the combustion chambers 148 by the spark plugs 146. Combustion gases 116 are discharged through the exhaust system 68. The engine 24 continues to run and provides a drive force that is transmitted to the drive system 26 through the transmission system 30. The drive track 104 of the drive system 26 revolves to drive the vehicle 20 over the travel surface 28.

Figure 6:
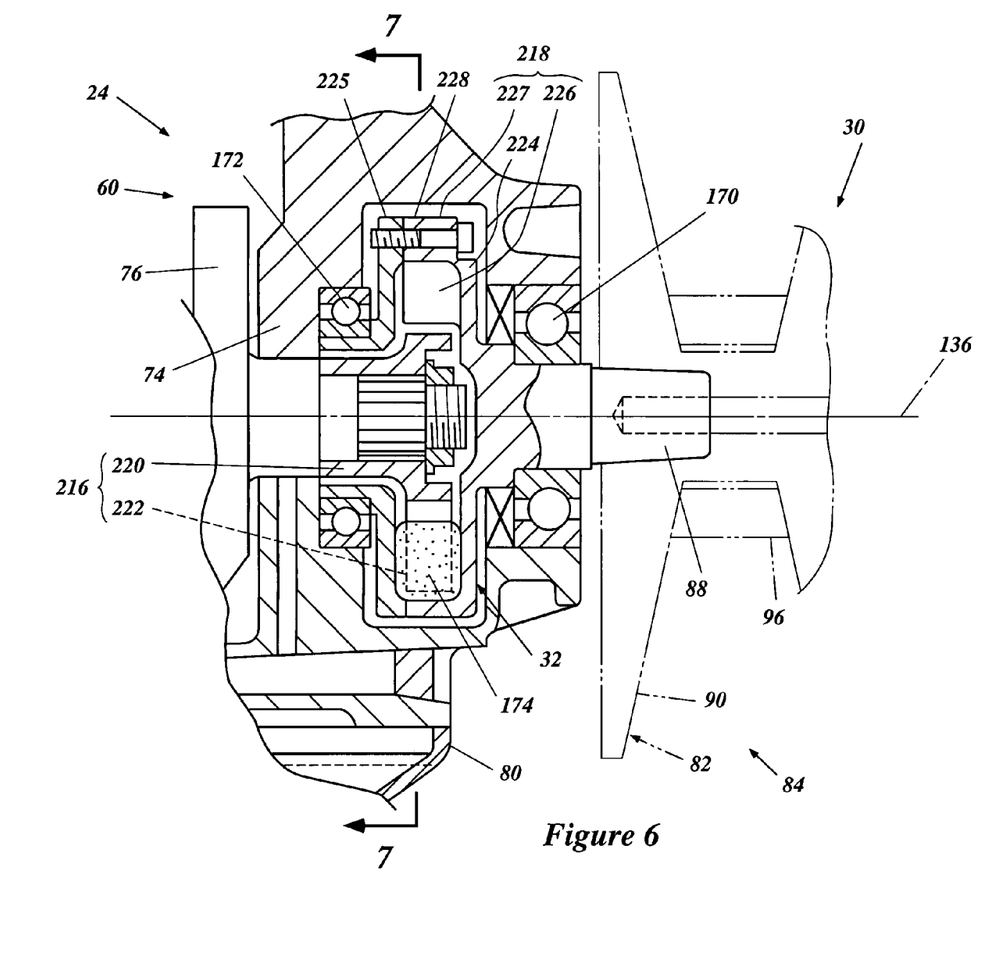
FIG. 6 is an enlarged cross-sectional view of a side portion of the engine shown in FIG. 3.
Figure 7:
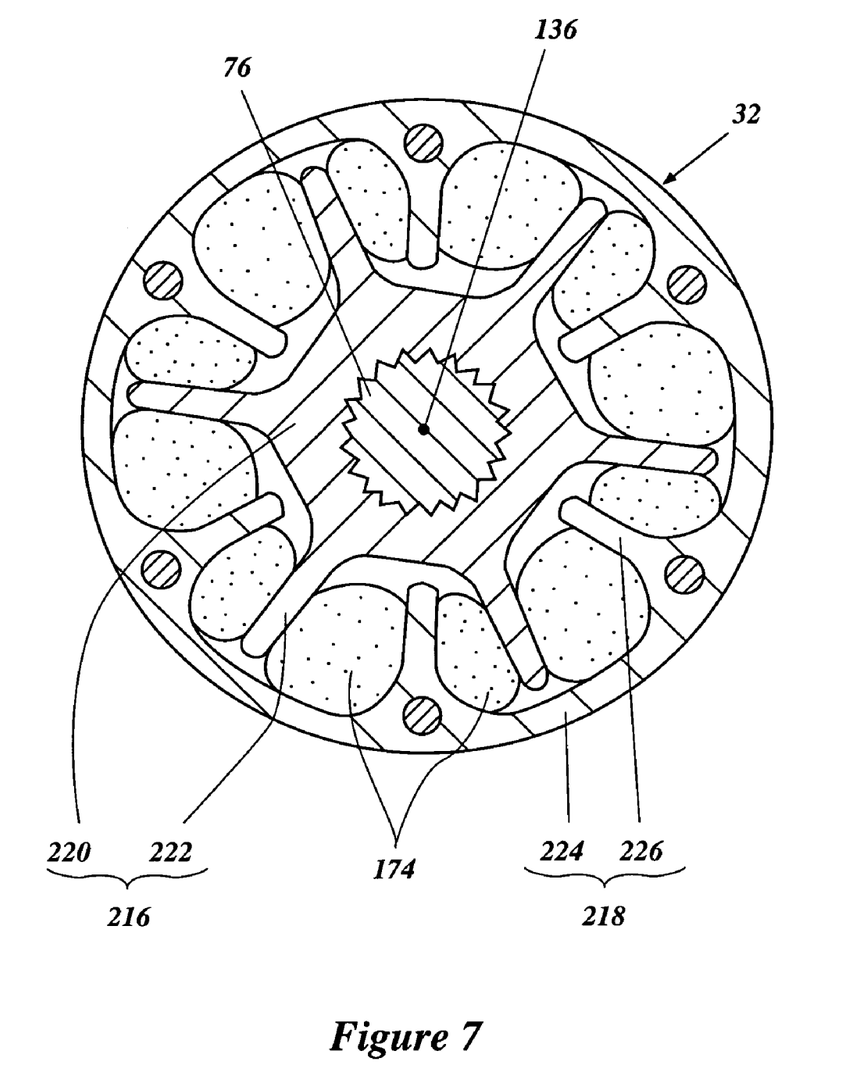
FIG. 7 is a sectional view of a portion of the engine of FIG. 3 taken along line 7-7 in FIG. 6.

As shown in FIGS. 6 and 7, the coupling device 32 comprises a drive member 216, a driven member 218, and a plurality of dampers 174. The drive member 216 comprises a base portion 220 and a plurality of blades 222 extending radially outward from the base portion 220. The base portion 220 of the drive member 216 is coupled with an end of the crankshaft 76. As shown in FIG. 7, the base portion 220 is engaged with the crankshaft 76 with a splined arrangement.

The driven member 218 comprises a base portion 224 and an inner support portion 225. The base portion 224 of the driven member 218 is coupled on a first side with the input shaft 88 of the transmission system 30. The base portion 224 also includes an annular outer wall 227 and a plurality of blades 226 extending radially inward from the outer wall 227. The damper members 174 are disposed between the outwardly extending blades 222 and the inwardly extending blades 226.

The inner support portion 225 extends inwardly, relative to the engine body 60, from the annular outer wall 227, over the crankshaft 76, and to the inner bearing 172. Additionally, the inner support portion 225 is connected to the base portion 224 with a plurality of bolts 228. Thus, the inner support portion 225 allows the input shaft 88 to be supported by both of the inner and out bearings 172, 170.

As such, the input shaft 88 is not supported only by the crankshaft. Rather, the input shaft 88 is rotatably supported by the crankcase 74. Thus, the bending loads applied to the input shaft through the interaction of the drive belt 96 and the drive pulley 90 are not transferred to the crankshaft 76. Rather, such bending loads are imparted to the bearings 170, 172. Additionally, because the drive member 216 is coupled with the driven member 218 within the crankcase 74, the coupling device 32 is protected from the environment in which the snowmobile 20 is operated.

In the illustrated embodiment, the drive member 216, and the dampers 174, are generally covered by the driven member 218. The base 220 of the drive member 216 extends axially out from the crankshaft 76 and the blades 222 of the drive member 216 extend radially out toward the base 224 of the driven member 218. The blades 226 of the driven member 218 extend radially in toward the base 220 of the drive member 216. The blades 222 of the drive member 216 are fitted in among the blades 226 of the driven member 218. The blades 222, 226 of the drive member 216 and the driven member 218 are alternately arranged in the coupling device 32. The dampers 174 are provided between pairs of adjacent blades 222, 226 in the coupling device 32.

The dampers 174 preferably comprise a compressible material that is wedged between a pair of adjacent blades 222, 226. The dampers 174 preferably comprise a rubber material. The dampers 174, being compressible, can absorb some of the initial or transient torque loads applied by the crankshaft 76 to the input shaft 88. By absorbing some of the torque applied in this manner, the dampers 176 make the transfer of rotational motion between the crankshaft 76 and the input shaft 88 smoother. This, in turn, improves the smoothness of the transmission 30, which also improves the ride of the vehicle 20.

The coupling device 32 preferably reduces impact forces that typically are transferred from the crankshaft 76 to the input shaft 88 by incorporating a plurality of dampers, such as the dampers 174. The coupling device 32 preferably comprises a simple configuration wherein the driven member 218 forms a housing around, or encloses, the drive member 216 and dampers 174. The compact design and configuration preferably facilitates rotatably mounting the coupling device 32 within the crankcase 74. Accordingly, the coupling device 32 provides increased strength and support for the transmission system 30 without greatly increasing the weight of the vehicle 20 as well as other features and advantages.

As discussed above, some embodiments discussed herein provide an improved coupling device 32. As shown in FIG. 6, the coupling device 32 is supported directly on the crankcase 76 of the engine. A driven member 218 of the coupling device 32 is supported at two bearing locations 170, 172 within the crankcase. The driven member 218 is coupled with, and supports, the input shaft 88 of the transmission system 30. Accordingly, the input shaft 88 is supported on the crankcase 74, through the coupling device 32, rather than being supported simply on a free end of the crankshaft 76. Supporting the input shaft 88 on the crankcase 74 provides added strength and support for the input shaft 88 and the transmission system 30. The coupling device 32 preferably provides a connection with greater strength and support without significantly increasing the weight of the vehicle 20 and without requiring changes in the design of the crankshaft 76.

Although the present inventions have been described in terms of a certain embodiment, other embodiments apparent to those of ordinary skill in the art also are within the scope of these inventions. Thus, various changes and modifications may be made without departing from the spirit and scope of the inventions. For instance, various components may be repositioned as desired. Moreover, not all of the features, aspects and advantages are necessarily required to practice the present inventions. Accordingly, the scope of at least one of the present inventions is intended to be defined only by the claims that follow.

What is claimed is:

1. A vehicle comprising:
    a vehicle body;
    an internal combustion engine mounted to said vehicle body, said engine comprising a crankshaft mounted in a crankcase, said crankshaft extending along a first axis;
    a drive system mounted to said vehicle body for contacting a travel surface, whereby rotation of at least a portion of said drive system enables movement of said vehicle body relative to the travel surface;
    a transmission coupled with said drive system; and
    a coupling system for coupling said engine with said transmission, said coupling system comprising a drive member and a driven member, said drive member being located along said first axis and being coupled with said crankshaft, said driven member being located along said first axis and being coupled with said transmission, said driven member being rotatably supported by said crankcase, and said drive member being coupled with said driven member, wherein the drive member is permanently meshed with the driven member and are configured to always rotate at the same speed.

2. The vehicle of claim 1, wherein said coupling system comprises a damper portion, said damper portion comprising at least one cushioning member located between said drive member and said driven member.

3. The vehicle of claim 1, wherein said driven member covers said drive member and a damper portion.

4. The vehicle of claim 1, wherein said driven member is supported at first and second ends thereof in said crankcase.

5. The vehicle of claim 1, wherein said driven member is mounted in said crankcase with bearings.

6. The vehicle of claim 1, wherein said coupling system is located generally within said crankcase.

7. The vehicle of claim 1, wherein said vehicle body comprises a saddle-riding seat.

8. The vehicle of claim 1, wherein said vehicle body comprises a steering assembly coupled with one or more skis.

9. The vehicle of claim 1, wherein said drive system comprises a drive track.

10. The vehicle of claim 1, wherein said driven member is disposed within said crankcase.

11. The vehicle of claim 1, wherein said driven member is directly supported by said crankcase.

12. A vehicle comprising:

a vehicle body;

an internal combustion engine mounted to said vehicle body, said engine comprising a crankshaft mounted in a crankcase, said crankshaft extending along a first axis;

a drive system mounted to said vehicle body for contacting a travel surface, whereby rotation of at least a portion of said drive system enables movement of said vehicle body relative to the travel surface;

a transmission coupled with said drive system; and a coupling system for coupling said engine with said transmission, said coupling system comprising a drive member and a driven member, said drive member being located along said first axis and being coupled with said crankshaft, said driven member being located along said first axis and being coupled with said transmission, said driven member being rotatably supported by said crankcase, and said drive member being coupled with said driven member, wherein the drive member includes a plurality of drive blades that extend radially outward, and the driven member includes a plurality of driven blades that extend radially inward and are configured to mate with the drive blades.

13. A vehicle comprising:

a vehicle body;

an internal combustion engine mounted to said vehicle body, said engine comprising a crankshaft mounted in a crankcase;

a drive system mounted to said vehicle body for contacting a travel surface;

a transmission coupled with said drive system; and coupling means for coupling said engine with said transmission within said crankcase;

wherein said coupling means comprises a driven member rotatably supported by said crankcase and a drive member, wherein the drive member is permanently meshed with the driven member such that the drive member and the driven member always rotate at the same speed.

14. The vehicle of claim 13, wherein said coupling means further comprises a means for damping.

15. The vehicle of claim 13, wherein said vehicle body comprises a saddle-riding seat.

16. The vehicle of claim 13, wherein said vehicle body comprises a steering assembly coupled with one or more skis.

17. The vehicle of claim 13, wherein said drive system comprises a drive track.

18. The vehicle of claim 13, wherein said means for coupling is disposed within said crankcase.

19. The vehicle of claim 13, wherein the drive member and the driven member are configured to always rotate at the same speed.

20. The vehicle of claim 13, wherein the drive member is permanently meshed within the driven member.

21. The vehicle of claim 13, wherein the driven member is directly supported by said crankcase.

22. A vehicle comprising:

a vehicle body;

an internal combustion engine mounted to said vehicle body, said engine comprising a crankshaft mounted in a crankcase;

a drive system mounted to said vehicle body for contacting a travel surface;

a transmission coupled with said drive system; and a means for coupling said engine with said transmission within said crankcase;

wherein said coupling means comprises a driven member rotatably supported by said crankcase and a drive member, wherein the drive member includes a plurality of drive blades that extend radially outward, and the driven member includes a plurality of driven blades that extend radially inward and are configured to mate with the drive blades.

* * * * *